United States Patent
Kock et al.

(10) Patent No.: US 12,199,531 B2
(45) Date of Patent: Jan. 14, 2025

(54) PREDICTIVE DEADBEAT CONTROL OF MOTOR PHASE CURRENTS WITH MODEL MISMATCH COMPENSATION AND ADJUSTABLE CONTROL DYNAMICS

(71) Applicant: Synapticon GmbH, Schönaich (DE)

(72) Inventors: Florian Kock, Schönaich (DE); Peyman Salehi Arashloo, Schönaich (DE)

(73) Assignee: Synapticon GmbH, Schönaich (DE)

( * ) Notice: Subject to any disclaimer, the term of this patent is extended or adjusted under 35 U.S.C. 154(b) by 155 days.

(21) Appl. No.: 17/924,904

(22) PCT Filed: May 6, 2021

(86) PCT No.: PCT/IB2021/053833
§ 371 (c)(1),
(2) Date: Nov. 11, 2022

(87) PCT Pub. No.: WO2021/229377
PCT Pub. Date: Nov. 18, 2021

(65) Prior Publication Data
US 2023/0188066 A1     Jun. 15, 2023

(30) Foreign Application Priority Data

May 13, 2020    (DE) .......................... 102020112913.0

(51) Int. Cl.
*H02P 21/22*      (2016.01)
*H02P 21/00*      (2016.01)

(52) U.S. Cl.
CPC .......... *H02P 21/0003* (2013.01); *H02P 21/22* (2016.02)

(58) Field of Classification Search
CPC ............................ H02P 21/0003; H02P 21/22
See application file for complete search history.

(56) References Cited

FOREIGN PATENT DOCUMENTS

| DE | 10038570 A1 | 12/2001 |
| DE | 102012107970 A1 | 2/2013 |

OTHER PUBLICATIONS

Baang et al: "Deadbeat Control for Linear Systems with input Constraints", IEICE Transactions on Fundamentals of Electronics, Communications and Computer Sciences, Engineering Sciences Society, Tokyo, JP, vol. E92A, No. 12, Dec. 1, 2009 (Dec. 1, 2009), pp. 3390-3393, XP001552374, (Year: 2009).*

(Continued)

*Primary Examiner* — Cortez M Cook
(74) *Attorney, Agent, or Firm* — Conley Rose, P.C.

(57) ABSTRACT

The invention relates to a motor control device for controlling a motor current, with a predictive deadbeat control unit configured to, based on a motor current error input signal, use a model predictive control scheme for providing an output signal for controlling the motor current according to a deadbeat control scheme, where the deadbeat control scheme is characterized by minimizing the motor current error input signal within a preset time period; an interface unit configured to allow adjusting the preset time period by a user input; and an integrator unit configured to, based on the motor current error input signal, provide an integrator output that is added to the output signal for controlling the motor current with controlling a motor current, with the advantages of a predictive deadbeat control scheme while avoiding the problems present in the conventional predictive deadbeat approaches. The invention also relates to a corresponding method.

17 Claims, 1 Drawing Sheet

(56) References Cited

OTHER PUBLICATIONS

Wang Zetal. "A Novel Current Predictive Control Based on Fuzzy Algorithm for PMSM", IEEE Journal of Emerging and selected topics in power electronics, IEEE, Piscataway, NJ, USA, vol. 7 No. 2, Jun. 1, 2019 (Jun. 1, 2019), pp. 990-1001, XP011721927, ISSN:2168-6777, DOI:10.1109/JESTPE.2019.2902634 (Year: 2019).*

* cited by examiner

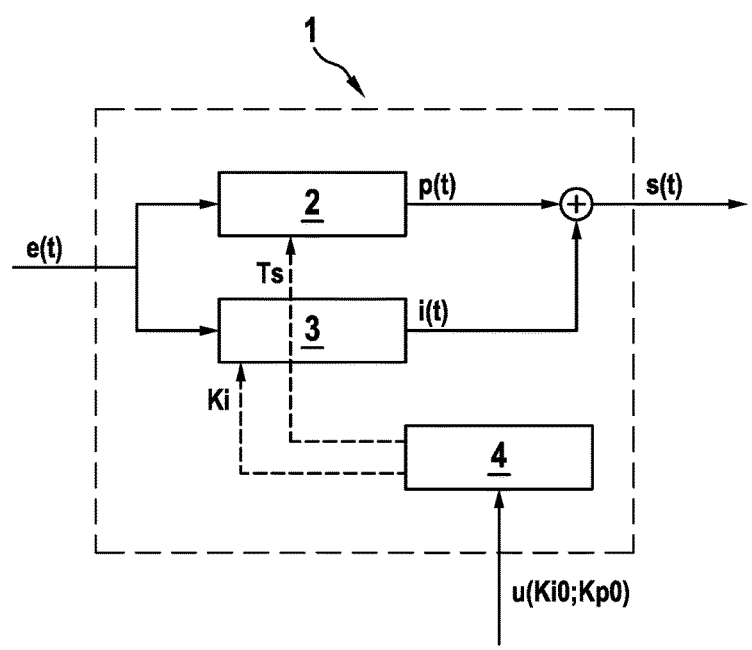

PREDICTIVE DEADBEAT CONTROL OF MOTOR PHASE CURRENTS WITH MODEL MISMATCH COMPENSATION AND ADJUSTABLE CONTROL DYNAMICS

CROSS-REFERENCE TO RELATED APPLICATIONS

This application is a national stage filing of International Application No. PCT/IB2021/053833, filed May 6, 2021, which claims priority to German Application No. 10 2020 112 913.0 filed May 13, 2020. The entire disclosures of the afore-mentioned patent applications are incorporated herein by reference.

The invention relates to a motor control device for controlling motor phase currents, by using a control unit which uses a model predictive control algorithm or scheme to provide an output signal for controlling the motor phase currents. There, the deadbeat control scheme is characterized by minimizing the motor phase current error within a preset time period.

Typically, predictive deadbeat control schemes are used in field orientated control, FOC, applications of three phase permanent magnet synchronous motors, PMSM, and brushless direct current, BLDC, and other three-phase alternative current, AC motors.

The main steps of field orientated control applications can be summarized as the following: firstly, reference values of stator (phase) currents in a rotating DQO reference frame, that is, Id* and Iq*, are received as inputs. Then, real, i.e. measured, values of stator phase currents Ia, Ib, and Ic, in a stationary or fixed ABC reference frame are sampled, and transferred into the rotating DQO reference frame. Using the Park and Clark transformation, stator phase currents in direct and quadrature directions, Id and Iq, are obtained. Then, real values, Id and Iq, and reference values, Id* and Iq*, of stator phase currents are sent to the motor control device, the current control unit. Reference values of voltages, Vd and Vq, are calculated in direct and quadrature direction in the rotating DQO reference frame and after that transferred back to the fixed ABC reference frame. The reference voltages in the ABC reference frame, Va, Vb and Vc, are modulated by using some pulse width modulation, PWM, scheme. Finally, the modulated voltages are generated and applied to the motor terminals by an inverter unit. The entire control unit and inverter unit is often referred to as motor drive. In the standard setup, the current control unit comprises a proportional-integral, PI, controller or a proportional-integral-derivative controller, PID controller, which is tuned based on motor parameter values and desired control dynamics (such as desired "damping ratio", "settling time", "bandwidth", etc.).

In case of using a PI controller in FOC applications, reference and calculated values of stator currents in direct and quadrature directions, Id*, Iq*, Id, and Iq, are passed to two PI controllers (one controller for direct direction accepting Id*, Id, and the other controller for quadrature direction accepting Iq*, Iq) to calculate the reference values of the stator terminal voltages in the same directions, Vd* and Vq*. The calculated reference values are transferred back to the stationary ABC reference frame, and applied to the motor terminals by using the PWM unit and inverter unit.

Predictive deadbeat control is a subcategory of predictive control, and is designed to ideally meet zero error and no overshoot by the end of next control execution cycle. Known predictive deadbeat control units are capable of removing the error in 1-1.5 control cycles. The implementation of predictive deadbeat control units is getting more and more common in high-performance applications such as motor drives.

However, removing the error within 1-2 control cycles means that predictive deadbeat controllers are very sharp and sensitive to the existence of noise. Predictive deadbeat controllers can be fine-tuned by using more precise model parameters and proper adjustment of the period in which the error should be removed, preset time period. Usually obtaining a good predictive deadbeat control response is challenging because the control algorithm is based on the equations which model a specific application. In other words, predictive deadbeat control units that claim to remove the error in a predetermined (minimized) number of control cycles, are based on the mathematical model of the system which is to be controlled (the plant). Therefore, a user wanting to tune (or finetune) the predictive deadbeat control unit at hand needs to be aware of the model of the system, i.e. the model equations implemented in the predictive deadbeat control unit. This, however, usually is out of a user's depth. Therefore, predictive deadbeat control units are not very popular in general.

In a nutshell, predictive deadbeat control in motor drives may comprise three main steps. These are 1) sampling motor current, 2) estimation of motor current, and 3) calculation of motor voltages.

Step 1, Sampling Motor Currents

Motor phase currents Ia, Ib, and Ic, are usually sampled in the middle of each control execution period. To have more simplicity in the calculations, measured values of the phase currents may be transferred from the stationary ABC reference frame into the rotating DQO reference frame. In brief, an exemplary transformation matrix from the stationary ABC reference frame to the rotating DQO reference frame can be written as:

$$I_{dqo} = T_1 T_2 I_{ABC} \qquad (1)$$

$$T_1 = \sqrt{\frac{2}{3}} \begin{bmatrix} 1 & -0.5 & -0.5 \\ 0 & \sqrt{3}/2 & \sqrt{3}/2 \\ 1/\sqrt{2} & 1/\sqrt{2} & 1/\sqrt{2} \end{bmatrix}$$

$$T_2 = \begin{bmatrix} \cos(\theta) & \sin(\theta) & 0 \\ -\sin(\theta) & \cos(\theta) & 0 \\ 0 & 0 & 1 \end{bmatrix},$$

where T1 and T2, are known as Clarke and Park transformation matrices.

For an exemplary surface mounted permanent magnet motor with a smooth airgap and sinusoidally distributed stator windings the relationship between motor currents and voltages in the rotating reference frame may be calculated as:

$$V_d = r i_d - \omega L i_q + L \frac{d}{dt} i_d \qquad (2)$$

$$V_q = r i_q + \omega(\lambda_d) + L \frac{d}{dt} i_q,$$

where L is motor inductance and r is motor phase resistance, w is electrical rotational speed in [rad/s], and Lambda is the effective magnetic flux linkage in direct direction, preferably in [wb].

Step 2, Estimation of Motor Currents

The current control algorithm is usually accomplished in the rotating DQO reference frame. The inputs for the current control unit will be reference and real values of motor currents (Idqo), and control outputs will be desired voltages in this rotating DQO reference frame. From equation set (2), it is possible to calculate the estimated phase currents by the end of period k. Motor equations are usually linearized at the moment of sampling, and their respective derivatives can be calculated. In general, estimated values of the motor phase currents by the end of period k can be calculated as:

$$\hat{i}(k) = i(k) + \frac{T}{2}\frac{d}{dt}i(k), \quad (3)$$

where T is the control execution period.

Step 3, Calculation of Desired Terminal Voltages

Once having the estimated values of the phase currents by the end of period k, it will be possible to calculate the required voltages in period (k+1) to achieve the desired motor currents, that is, the desired reference motor currents by the end of period (k+1). In general, the desired voltage values which should be generated by the inverter unit can be written as:

$$v(k+1) = \frac{L}{2T}(i^*(k) - i(k)) - \frac{1}{4}v(k) + \frac{r}{4}(i(k) + 2\hat{i}(k)). \quad (4)$$

The calculated voltages can then be transferred back to the stationary ABC reference frame. Once having the desired reference values in the stationary ABC reference frame, it will be possible to use any suitable PWM strategy or scheme to generate these voltages by the inverter unit.

The following references provide further insights in predictive current control in motor applications, in particular predictive deadbeat current control:

M. S. Trivedi, R. Kumar Keshri, "Evaluation of Predictive Current Control Techniques for PM BLDC Motor in Stationary Plane", IEEE Access (Volume: 8), Page(s): 46217-46228, March 2020, Electronic ISSN: 2169-3536

Shin-Won Kang, Jae-Hwan Soh, Rae- Young Kim, "Symmetrical Three-Vector- Based Model Predictive Control With Deadbeat Solution for IPMSM in Rotating Reference Frame", IEEE Transactions on Industrial Electronics, IVol. 67, Issue. 1, 2020

Niu Li, Yang Ming, Gui Xianguo, Xu Dianguo, "A Comparative Study of Model Predictive Current Control and FOC for PMSM", 2014 17th International Conference on Electrical Machines and Systems (ICEMS), Oct. 22-25, 2014, Hangzhou, China Fengxiang Wang, Zhenbin Zhang, Xuezhu Mei, Jose Rodriguez, Ralph Kennel, "Advanced Control Strategies of Induction Machine: Field Oriented Control, Direct Torque Control and Model Predictive Control", Energies 2018, www.mdpi.com/journal/energies U.S. Pat. No. 8,400,798 B2 also discloses a predictive current control in driving a load in a PWM mode.

The objective technical problem to be solved can therefore be considered as controlling a motor current, with the advantages of a predictive deadbeat control scheme while avoiding the problems present in the conventional predictive deadbeat approaches.

This problem is solved by the subject-matter of the independent claims. Advantages and advantageous embodiments are apparent from the dependent claims, the description, and the figures.

One aspect of the invention relates to a motor control device for controlling motor current. The motor current may be a motor phase current, in particular motor three-phase currents, which are flowing through the windings of the motor. Said motor control device comprises a predictive deadbeat control unit (or predictive deadbeat current control unit), which is configured to, based on a motor current error input signal, use a model predictive deadbeat control scheme for providing an output signal for controlling the motor current according to a deadbeat control scheme.

The deadbeat control scheme is characterized by minimizing the motor current error input signal within a preset time period, for instance 1-1.5 control cycles. This preset time period is usually optimized to be as short as possible in order to allow a fast minimization of the motor current error input signal. In the conventional setting, i.e. the prior art, said preset time period cannot/is not to be modified by a user. Namely, they are tuned to one specific application by their designer. As described above, this objective leads to the undesired complex tuning characteristics afterwards.

Any predictive deadbeat control unit uses a (mathematical) motor model to calculate the desired voltages which should be applied to the motor. If the parameters of motor in the real world are not exactly equal to their corresponding parameters in the motor model a steady-state error will appear in the response of the controller (generated motor phase currents). The proposed solution overcomes this weak point by adding the integrator unit in parallel to the predictive deadbeat controlling unit, as described in more detail below.

The proposed motor control device comprises an interface unit configured to allow adjusting the preset time period by a user input. The term "user input" may also refer to a set of user inputs in the disclosure at-hand. This adjusting may be a direct and/or an indirect adjusting. In direct adjusting, the user input may comprise a specific value for the preset time period, be it a specific time, such as, for instance, 100 micro seconds or a specific number of control cycles, for instance, two control cycles. In indirect adjusting, the user input may comprise, as specified further below, a parameter which then is used by the interface unit to calculate the value the preset time period is adjusted to (that is set to) by the user input. In particular, the interface unit may be configured to allow adjusting the preset time period during operation of the motor control device. The interface unit may also be configured to allow adjusting the preset time period to be within a given range, for instance between the minimal preset time period and the tenfold of the minimal time period, or configured to not let the user adjust the preset time period to the minimal preset time period. The interface unit may be implemented by a graphical user interface, GUI, respective code lines in a soft- or firmware of the motor control device, or alike.

The motor control device further comprises an integrator unit configured to, based on the motor current error input signal, provide an integrator output that is added to the output signal for controlling the motor current, for controlling the motor current. So, the integrator unit is added in parallel to the predictive deadbeat control unit. If the parameters of motor model in predictive deadbeat control unit are not exactly matching the reality (known as model mismatch), a steady state error will appear in the response of the system (i.e. the motor phase currents). One of the advantages of integrator unit is to compensate for model mismatch in predictive deadbeat control unit such as wrong motor parameters or wrong voltage amplitudes.

So, the invention is based on the insight that the main problem of previous implementations of a predictive deadbeat control unit is that it is difficult for a user to properly tune the control unit, and model mismatch (wrong motor parameters in motor model) leads to a steady-state error in motor phase currents. That is, the standard user or end user usually knows the standard control criteria from PID/PI control units, which are usually two independent parameters, for instance a damping ratio and a settling time, or, equivalently, a damping ratio and a bandwidth, or, equivalently, a gain margin and a phase margin. Parameters corresponding to these standard control criteria are not directly modifiable in the known implementations of predictive deadbeat control units, leading to the difficulties in tuning or fine tuning the known predictive deadbeat control units.

This problem of difficult tuning of predictive deadbeat control units is overcome by the synergistic effect of two features:

According to the first feature, the period in which current errors should be removed by the predictive deadbeat control has become adjustable, i.e. adjustable for the user. In contrast, all previous predictive deadbeat control units are designed to remove the error in a fixed time period, usually a minimal time period, that cannot or is not to be modified by the (end-) user. According to the proposed motor control device, this time period has become adjustable (or flexible), so that the user can change the length of this time period during a configuration process (e.g. in a configuration mode) or even generally during runtime of the motor control device. Considering the concept or definition of a rise time in the standard setup, like the PI/PID setup, this modification allows to dynamically modify the rise time of the predictive deadbeat control unit.

The second feature is the integrator unit being added in parallel to the predictive deadbeat control unit. The integrator unit may be similar or identical to integrator units known from the standard PI or PID controllers or control devices.

With these features, it is now possible for a user to use standard control criteria such as a desired settling time and a damping ratio for the predictive deadbeat controller unit. The proposed structure allows the user to think of the motor control device featuring a predictive deadbeat control scheme as of a simple control device such as a PI or PID controller, where in fact the "P" part is replaced by a predictive deadbeat control unit. Accordingly, the desired parameters of settling time and damping ratio for the current controller may be provided by the user.

Namely, for the given settling time and damping ratio, the desired Kp and Ki constants of a PI control device can be calculated based on the available motor parameters. They can be referred to as Kp0 and Ki0. Then, the predictive deadbeat control can be automatically tuned in a way that its rise time is equal to the rise time of the "P" part of the PI controller considered in the previous step.

To achieve this, the rise time Tr of the system, with only the "P" part of the PI controller under consideration being active (that is, when Kp=Kp0 and Ki=0), can be calculated. Knowing Tr, the total time Ts which is needed for the step response to raise from 0 to 100% of the steady-state may be calculated. Note that in this example, the rise time would be defined as the rise time $t_{100}$, but could also be defined according to other definitions. For example $t_{95}$, then considering the time in which the step response raises from 0 to 95% of the steady-state or as $t_{10\text{-}90}$, the time which is needed for the step response to raise from 10% to 90% of the steady-state. Then, the deadbeat predictive controller may be tuned, in particular tuned automatically, in a way that it removes the error in a period equal to Ts, or equal to Ts divided by 0.95 or Ts divided by 0.80, in the respective examples. Finally, this allows the replacing of the "P" part in the PI control unit, by the tuned deadbeat predictive controller with the integrator unit being kept and Ki=Ki0.

So, the proposed control device has the advantages of the fast dynamics and a transient response of a predictive deadbeat controller combined with a flexible fine-tuning of the controller based on standard control tuning criteria, and a zero steady-state error due to the implementation of the integrator unit. These advantages are achieved by combining the adjustable preset time period, in which the error is to be eliminated by the predictive deadbeat controller, with the integrator unit in parallel to the predictive deadbeat control unit.

In an advantageous embodiment, the integrator unit has a preset integrator gain, in particular a preset constant integrator gain, and the interface unit is configured to allow adjusting the preset integrator gain by the user input, i.e. by using the user input. So, preferably, the integrator gain is a constant value that can be (pre)set by the user interface. This gives the advantage that the user input can define the behavior of both predictive deadbeat control unit and integrator unit, and therefore allows particular intuitive and easy tuning of the motor control device.

In particular, the interface unit may be configured to (automatically) calculate and adjust the preset integrator gain based on at least a first parameter (i.e. based on at least one first value or first number) contained in the user input. This gives the advantage of a particular easy and intuitive tuning of the system. In particular, the exactly one value of the first parameter may define the characteristics of the integrator unit, and thus the damping ratio and/or gain margin leading to an improved usability.

In another advantageous embodiment, the interface unit is configured to (automatically) calculate and adjust the preset time period based on at least a second parameter (i.e. based on at least one second value or second number) contained in the user input. This gives the advantage of a particular easy and intuitive tuning of the motor control device as a desired behavior. For instance a desired settling time and/or bandwidth and/or phase margin of the predictive deadbeat control unit may be achieved with setting only one parameter.

In yet another advantageous embodiment, the interface unit is configured to calculate the preset time period and/or the preset integrator gain based on the first parameter of the user input and the second parameter of the user input using a mathematical model of the electric motor. This mathematical model of the electric motor intended for use with the motor control device may reflect or represent a nonlinear relation between the respective parameter of the user input and the preset time period and/or the preset integrator gain.

As an example, if the motor is a first order system, the mathematical model of the electric motor may quantify (or specify) a linear relation between the system rise time and the corresponding settling time. For instance, the rise time can be calculated to 0.55 times the settling time. So, by knowing the desired settling time, for instance from the user input, the required rise time can be computed. The rise time, however is defined differently in many references. If it is defined as the time in which the step response goes from 10% to 90% of the steady-state value, the rise time can be defined as 80% of the time in which the error should be removed for a predictive deadbeat controller. Therefore, the rise time equals 0.8 times the error removal time, i.e. the preset time period in which the motor current error input signal is minimized. This can be generalized by the rise time being defined as the time needed for system output to go from x % to y % of steady-state value. Then, the rise time equals the time difference between y % and x %.

Thus, based on said two relations between rise time and settling time on the one side and rise time and error removal time on the other side, the period in which the error should be removed, i.e. the preset time period of the predictive deadbeat control unit, can be computed automatically based on the desired settling time of the user input. This also generally applies to first and/or second parameter of the user input.

For a second order system, corresponding calculations can be identified. In particular, the mathematical model of the electric motor can be exhaustive, that means the electric motor can be described completely by mathematical equations.

Preferably, first and second parameter of the user input represent a set of two independent parameters. The set of independent parameters may be of or similar to one or several sets of independent parameters known from a standard PI or PID controller (or control device). In particular, the first and second parameter, respectively, may represent a damping ratio and settling time, respectively, or a damping ratio and bandwidth, respectively, or gain margin and phase margin, respectively. Here, damping ratio and gain margin correspond to the first parameter, settling time, bandwidth, and phase margin correspond to the second parameter. As explained below, first and second parameter of the user input may represent a set of only two independent parameters. This is particularly advantageous, as two parameters would be enough to adjust the system and the particular parameters are well known to the user and therefore allow a particular easy and intuitive fine-tuning of the motor control device.

In an advantageous embodiment, the user input comprises only the first and only the second parameter or only the first and only the second parameter along with one, preferably exactly one specifier. This specifier preferably represents a definition of a rise time. This further extends the advantages described in the last paragraph.

A further aspect of the invention relates to a motor device, in particular a robotic device with a motor control device according to any of the described embodiments.

Preferably, the motor device is a low volt (LV) motor device. In particular, low volt may refer to a voltage below 50 or below 60 V. Correspondingly, the motor control device may be configured for a LV motor or LV motor device.

Another aspect of the invention relates to a method for controlling a motor current, with the method steps of a) adjusting a preset time period for a predictive deadbeat control unit which is configured to, based on a motor model and a motor current error input signal, use a model predictive deadbeat control scheme for providing an output signal, where the deadbeat control is characterized by minimizing the motor current error input signal within the preset time period, b) providing the motor current error input signal, c) using, by the predictive deadbeat control unit, the model predictive deadbeat control scheme for providing an output signal for controlling the motor current, and d) adding an integrator output provided by an integrator unit based on the motor current error input signal to the output signal for controlling the motor current. The method steps a to d) may be executed in the given order.

Advantages and advantageous embodiments of the method correspond to advantages and advantageous embodiments of the motor control device and the motor device, respectively.

The features and combinations of features described above, as well as the features and combinations of features disclosed in the figure description or the figures alone may not only be used alone or in the described combination, but also with other features or without some of the disclosed features without leaving the scope of the invention. Consequently, embodiments that are not explicitly shown and described by the figures but that can be generated by separately combining the individual features disclosed in the figures are also part of the invention. Therefore, embodiments and combinations of features that do not comprise all features of an originally formulated independent claim are to be regarded as disclosed. Furthermore, embodiments and combinations of features that differ from or extend beyond the combinations of features described by the dependencies of the claims are to be regarded as disclosed.

Exemplary embodiments are further described in the following by means of a schematic drawing.

FIG. 1 shows an exemplary embodiment of a motor control device. The motor control device 1 for controlling a motor current comprises a predictive deadbeat control unit 2 and an integrator unit 3. The predictive deadbeat control unit 2 is configured to, based on a motor current error input signal e(t), use a model predictive control scheme for providing an output signal p(t) for controlling the motor current according to a deadbeat control scheme, where the deadbeat control scheme is characterized by minimizing the motor current error input signal e(t) within a preset time period Ts. The integrator unit 3 is configured to provide an integrator output i(t) that is added to the output signal p(t) for controlling the motor current, with, in the present example, the sum signal s(t)=p(t)+i(t).

The motor control device 1 further comprises an interface unit 4 configured to allow adjusting the preset time period Ts, and, in the present example, also the preset integrator gain Ki, by a user input u(Ki0, Kp0). In the shown example, the user input comprises a first parameter Ki0 which may be used to adjust the preset integrator gain Ki and a second parameter Kp0 which may be used, preferably in conjunction with the first parameter, to adjust the preset time period Ts. In the present example, the user input u(Ki0, Kp0) only comprises these two single parameters. The interface unit 4 is, in the present example, configured to calculate the preset integrator gain Ki and the preset time period Ts based on the user input u(Ki0, Kp0) by calculating the preset time period Ts based on the second parameter Kp0 and the preset integrator gain Ki based on the calculated preset time period Ts and the first parameter Ki0 of the user input u(Ki0, Kp0). Alternatively, the preset integrator gain Ki may, for instance, equal the first parameter Ki0, and the preset time period Ts may be calculated by the interface unit 4 using a mathematical model of the electric motor which is to be controlled by the sum signal s(t) based on only the second parameter Kp0 of the user input u(Ki0, Kp0).

The invention claimed is:

1. A motor control device for controlling a motor current, comprising:
   a predictive deadbeat control unit configured to, based on a motor current error input signal, use a model predictive control scheme for providing an output signal (p) for controlling the motor current according to a deadbeat control scheme, where the deadbeat control scheme is characterized by minimizing the motor current error input signal (e) within a preset time period (Ts);
   an interface unit configured to allow adjusting the preset time period (Ts) by a user input (u); and an integrator unit configured to, based on the motor current error input signal (e), provide an integrator output (i) that is added to the output signal (p) for controlling the motor current;

wherein the interface unit is configured to calculate and adjust the preset time period (Ts) based on at least a parameter (Kp0) contained in the user input (u).

2. The motor control device according to claim 1, wherein:
the integrator unit has a preset integrator gain (Ki), in particular a preset constant integrator gain, and
the interface unit is configured to allow adjusting the preset integrator gain (Ki) by the user input (u).

3. The motor control device according to claim 2, wherein:
the interface unit is configured to calculate and adjust the preset integrator gain (Ki) based on at least a parameter (Ki0) contained in the user input (u).

4. The motor control device according to claim 1, wherein:
the interface unit is configured to calculate the preset time period (Ts) and/or a preset integrator gain (Ki) based on a parameter (Ki0) of the user input (u) and the parameter (Kp0) of the user input (u) using a mathematical model of an electric motor which quantifies a nonlinear relation between the respective parameter (Ki0, Kp0) of the user input (u) and the preset time period (Ts) and/or the preset integrator gain (Ki).

5. The motor control device according to claim 1, wherein:
a parameter (Ki0) and the parameter (Kp0) of the user input (u) represent a set of independent parameters that include: damping ratio and settling time, or damping ratio and bandwidth, or gain margin and phase margin.

6. The motor control device according to claim 5, wherein:
the user input (u) comprises only the parameter (Ki0) and the parameter (Kp0) or only the parameter (Ki0) and the parameter (Kp0) along with a specifier which represents a definition of a rise time.

7. The motor control device according to claim 5, wherein:
the integrator unit has a preset integrator gain (Ki), in particular a preset constant integrator gain, and
the interface unit is configured to allow adjusting the preset integrator gain (Ki) by the user input (u).

8. The motor control device according to claim 7, wherein:
the interface unit is configured to calculate and adjust the preset integrator gain (Ki) based on at least the parameter (Ki0) contained in the user input (u).

9. The motor control device according to claim 5, wherein:
the interface unit is configured to calculate the preset time period (Ts) and/or a preset integrator gain (Ki) based on the parameter (Ki0) of the user input (u) and the parameter (Kp0) of the user input (u) using a mathematical model of an electric motor which quantifies a nonlinear relation between the respective parameter (Ki0, Kp0) of the user input (u) and the preset time period (Ts) and/or the preset integrator gain (Ki).

10. The motor control device according to claim 5, wherein:
the user input (u) comprises only the parameter (Ki0) and the parameter (Kp0) or only the parameter (Ki0) and the parameter (Kp0) along with a specifier which represents a definition of a rise time.

11. The motor control device according to claim 1, wherein:
the user input (u) comprises only a parameter (Ki0) and the parameter (Kp0) or only the parameter (Ki0) and the parameter (Kp0) along with a specifier which represents a definition of a rise time.

12. A robotic device having the motor control device according to claim 1.

13. A method for controlling a motor current, comprising:
adjusting, by a user input (u), a preset time period (Ts) for a predictive deadbeat control unit which is configured to, based on a motor model and a motor current error input signal (e), use a model predictive deadbeat control scheme for providing an output signal (p), where the predictive deadbeat control scheme is characterized by minimizing the motor current error input signal (e) within the preset time period (Ts);
providing the motor current error input signal (e);
using, by the predictive deadbeat control unit, the model predictive deadbeat control scheme for providing the output signal (p) for controlling the motor current; and
adding an integrator output (i) provided by an integrator unit based on the motor current error input signal (e) to the output signal (p) for controlling the motor current;
wherein the preset time period (Ts) is adjusted based on at least a parameter (Kp0) contained in the user input (u).

14. The method for controlling a motor current according to claim 13, wherein:
the preset time period (Ts) and/or a preset integrator gain (Ki) is calculated based on a parameter (Ki0) of the user input (u) and the parameter (Kp0) of the user input (u) using a mathematical model of an electric motor which quantifies a nonlinear relation between the respective parameter (Ki0, Kp0) of the user input (u) and the preset time period (Ts) and/or the preset integrator gain (Ki).

15. The method for controlling a motor current according to claim 13, wherein:
a parameter (Ki0) and the parameter (Kp0) of the user input (u) represent a set of independent parameters that include: damping ratio and settling time, or damping ratio and bandwidth, or gain margin and phase margin.

16. The method for controlling a motor current according to claim 15, wherein:
the preset time period (Ts) and/or a preset integrator gain (Ki) is calculated based on the parameter (Ki0) of the user input (u) and the parameter (Kp0) of the user input (u) using a mathematical model of an electric motor which quantifies a nonlinear relation between the respective parameter (Ki0, Kp0) of the user input (u) and the preset time period (Ts) and/or the preset integrator gain (Ki).

17. The method for controlling a motor current according to claim 13, wherein:
the user input (u) comprises only a parameter (Ki0) and the parameter (Kp0) or only the parameter (Ki0) and the parameter (Kp0) along with a specifier which represents a definition of a rise time.

* * * * *